United States Patent
Hänninen et al.

(10) Patent No.: US 6,835,035 B1
(45) Date of Patent: Dec. 28, 2004

(54) METHOD AND DEVICE FOR SECURING HORIZONTALLY LOADED CARGO UNITS TO A VESSEL

(75) Inventors: Mikko Hänninen, Helsinki (FI); Martti Salokannel, Järvenpää (FI); Markku Seppälä, Vantaa (FI)

(73) Assignee: Finnlines Oyj, Helsinki (FI)

( * ) Notice: Subject to any disclaimer, the term of this patent is extended or adjusted under 35 U.S.C. 154(b) by 0 days.

(21) Appl. No.: 09/937,970

(22) PCT Filed: Mar. 29, 2000

(86) PCT No.: PCT/FI00/00264

§ 371 (c)(1),
(2), (4) Date: Oct. 1, 2001

(87) PCT Pub. No.: WO00/59777

PCT Pub. Date: Oct. 12, 2000

(30) Foreign Application Priority Data

Apr. 1, 1999 (FI) .................................................. 990730

(51) Int. Cl.[7] ................................................ B60P 7/08
(52) U.S. Cl. ............................. 410/57; 410/56; 410/64; 410/77; 410/85
(58) Field of Search ............................ 410/77, 80, 85, 410/64, 56, 57, 129; 24/287; 248/500; 114/75

(56) References Cited

U.S. PATENT DOCUMENTS

| | | | | | |
|---|---|---|---|---|---|
| 929,139 | A | * | 7/1909 | Kircher ......................... | 410/77 |
| 2,159,479 | A | * | 5/1939 | Goodwin et al. .............. | 410/65 |
| 2,631,885 | A | * | 3/1953 | Ault ............................... | 410/67 |
| 3,083,670 | A | * | 4/1963 | Harlander et al. ............ | 410/85 |
| 3,200,977 | A | | 8/1965 | Thouvenelle et al. | |
| 3,446,462 | A | * | 5/1969 | Brenia ........................... | 410/77 |
| 3,603,544 | A | | 9/1971 | Griffith | |
| 3,722,714 | A | * | 3/1973 | Morris et al. .................. | 410/85 |
| 3,776,169 | A | | 12/1973 | Strecker | |
| 4,294,185 | A | | 10/1981 | Nordstrom et al. | |
| 4,341,495 | A | * | 7/1982 | Del Acqua ..................... | 410/78 |
| 4,497,271 | A | | 2/1985 | Gloystein | |
| 4,648,764 | A | * | 3/1987 | Pavlick .......................... | 410/77 |
| 4,732,516 | A | * | 3/1988 | Borchardt ...................... | 410/77 |
| 4,950,114 | A | * | 8/1990 | Borchardt ...................... | 410/82 |
| 5,017,065 | A | * | 5/1991 | Krug et al. .................... | 410/58 |

FOREIGN PATENT DOCUMENTS

| | | |
|---|---|---|
| FI | 863955 | 3/1988 |
| GB | 1413842 | 11/1975 |
| SE | 390939 | 1/1977 |
| WO | 9730890 | 8/1997 |
| WO | 9901304 | 1/1999 |

OTHER PUBLICATIONS

Article; "Gorthons nya skogsproduktfartygspecialutrustade för kassetter", Svensk Sjöfarts Tidning 46, 1994, p. 18.

* cited by examiner

Primary Examiner—Stephen Gordon
(74) Attorney, Agent, or Firm—Steinberg & Raskin, P.C.

(57) ABSTRACT

The invention relates to a method for securing horizontally loaded cargo units on a vessel, in which method the cargo units (13) are handled and secured for transporting the cargo units (13) on the vessel. The cargo unit (13) is secured to the vessel and/or to an adjacent cargo unit (13) by means of securing elements extending in the longitudinal direction of the cargo unit such that securing parts (11, 12) of the securing element (10) fixed to a bulkhead (15) of the vessel and to the cargo unit or to adjacent cargo units form an interlocking coupling, whereby the cargo unit (13) that is secured remains in place in the securing position. The invention also relates to a device for securing horizontally loaded cargo units on a vessel, which device is used for securing the cargo units (13) for transport on the vessel. The device is formed as a securing element (10) extending in the longitudinal direction of the cargo unit, which securing element comprises securing parts (11, 12) fixed to adjacent cargo units or to a cargo unit and a bulkhead (15) of the vessel adjacent to the cargo unit, which securing parts form an interlocking coupling such that the cargo unit (13) that is secured remains in place in the securing position.

18 Claims, 5 Drawing Sheets

METHOD AND DEVICE FOR SECURING HORIZONTALLY LOADED CARGO UNITS TO A VESSEL

FIELD OF THE INVENTION

The present invention relates to an apparatus and method for securing horizontally loaded cargo units to a vessel.

BACKGROUND OF THE INVENTION

As known in prior art, units moving on wheels are secured on a horizontally loaded vessel, in particular semitrailers, rolltrailers and cassettes are secured on a ro-ro vessel, by using different chains, webbings and wires, by means of which each cargo unit is fastened to the deck of the vessel. One problem in using chains, webbings and wires for lashing the cargo unit to the deck of the vessel is that, when these are used, the unit lashed to the deck together with lashings and the deck structure does not necessarily always form a continuous structure of sufficient strength, which might result in the shifting of cargo in the cargo space in case the number or the quality of lashings is inadequate. A problem with these known lashings is also that the lashing is done by hand, which is in itself rather expensive and time-consuming.

As known in prior art, the vessel and the cargo unit are usually parallel, in which connection the forces which are caused by the movements of the vessel and which are directed at the cargo are greatest in the transverse direction, which means that transverse securing is very important when cargo units are lashed to the vessel. Safety factors are also important, and when chains, webbings, wires, etc. known from prior art are used, one problem is that it is possible to fit them in a wrong manner, in which connection the lashing does not necessarily fulfil the function set for it.

As known in prior art, in addition to chains, webbings, etc., a trestle, or a trailer horse, is used in connection with securing of semitrailers, the wheelless end of the semitrailer being supported by means of the trestle for the time of transport on the vessel. Semitrailers are conventionally provided with their own legs, by means of which the wheelless end can be supported ashore, but these legs do not alone sustain the load which is directed at them from the unit and its cargo during sea transport as a result of the movements of the vessel, and thus said trestle or equivalent is needed for support of the semitrailer during sea transport. The trestle is usually made of steel and it is placed manually under the wheelless end of the semitrailer.

With respect to the prior art relating to the invention, reference may be made, for example, to the magazine article "*Corthons nya skogsprodukifanyg specialutrustade för kassetter*", Svensk Sjöfarts Tidning 46, from the year 1994, page 18, which describes a cassette ship in which units specially designed for this purpose, cassettes, are supported on one another in the transverse direction. This prior-art arrangement suffers, however, from the problem that the unit is not secured to the vessel and that the cargo space of the vessel shall be dimensioned and constructed such that it is suitable for support of cassette units. The supporting method can be used only for units designed for this purpose.

U.S. Pat No. 3,603,544 discloses one solution for securing semitrailers, in which a box is placed under the wheelless end of a semitrailer, which box is coupled to the kingpin of the semitrailer and which is screwed in an internally threaded hole located in the deck. In the arrangement in accordance with U.S. Pat No. 3,603,544 there is a kingpin beneath the top plate for coupling a tractor, and the top plate comprises a locking arrangement by which it is connected to a semitrailer. A problem in this known arrangement is that decks of the vessel contain a large number of holes which shall be kept clean, which is rather troublesome and causes a large number of cleaning operations.

One solution representing prior art is described in the international patent application PCT/SE 97/00381, (WO 97/30890), which discloses a method and a device for loading, securing and unloading semitrailers, which method employs a box-like trestle-type of support means for a semitrailer, which means comprises parts for supporting the front part of the semitrailer, a coupling member provided on the trestle which is coupled to the fifth wheel of a tugmaster, and the support further comprises members for fastening the trestle to the kingpin of the semitrailer, and at least one locking device by means of which at least one of several predetermined locking points is secured to a deck of a cargo space of a vessel. A problem with this prior art arrangement is constituted by the holes which are located in the deck and which are needed for securing, the cleaning of said holes being problematic. Moreover, this known arrangement is suitable only for a vessel constructed for this purpose because the vessel must be provided with locking holes in the deck for the securing trestle locations. Since the units which are secured are not necessarily equal in length, in order to avoid a waste of space, the number of holes required is far higher than the number of holes used at each particular time. The provision of such an arrangement for new ships is expensive and for old ships very expensive. This known arrangement is also expensive to build and requires a lot of maintenance because of the complicated mechanism used in locking it to the deck.

OBJECTS AND SUMMARY OF THE INVENTION

When handling a unit moving in a horizontal plane, for example, a trailer, rolltrailer, etc., it is essentially important in securing the cargo unit on a vessel that it could be locked to the vessel such as to achieve a continuous structure that is as rigid as possible. Thus, one object of the invention is to provide an arrangement which when it is used allows securing to be accomplished such that the cargo unit forms a rigid continuous structure together with the vessel, and also to provide a securing system by means of which the movements of the cargo unit secured are prevented transversely in particular but also longitudinally with respect to the sailing direction of the vessel.

An object of the invention is also to provide a securing arrangement which is suitable for use in connection with all types of vessels loaded horizontally, both new vessels and those already in service, in particular ro-ro vessels.

A further object of the invention is to provide an arrangement by means of which a semitrailer can be supported and secured on a ship such that the securing arrangement forms a rigid continuous structure and its use is easy, simple and safe.

A particular further object of the invention is to provide a trestle which is suitable for use in many types of cargo-carrying vessels to serve as a trestle used in connection with securing, handling and supporting of semitrailers, and which allows supporting and securing to be accomplished reliably, and the use of which in connection with a tugmaster is easy, and which does not require any special arrangements on a ship's deck or the arrangements to be made for it can be accomplished economically both on old and new vessels.

With a view to achieving the objectives stated above as well as those that will come out later, the method according to the invention is mainly characterized in what is set forth in the characterizing clause of claim 1.

The device according to the invention is in turn mainly characterized in what is set forth in the characterizing clause of claim 9.

By means of the securing element in accordance with the invention, a cargo unit moved in the horizontal plane: for example, a trail, a rolltrailer, or a cassette can be locked to a vessel such that a rigid continuous structure is achieved, which can be considered a solution that is technically superior to the lashing of a cargo unit known from the current state of the art. A first securing part formed by a rail extending in the longitudinal direction with respect to the loading direction of the units is fitted onto a bulkhead of a vessel and a second securing part formed by a mating rail or hook is fixed to the cargo unit, which second securing part can be locked to the rail fitted onto the vessel. The securing parts form a securing element. The section of the securing element forms a geometric form such that the parts of the element cannot be detached from each other without substantial deformation. By means of the securing arrangement in accordance with the invention, it is thus possible to prevent transverse movements in particular with respect to the sailing direction of the vessel, and the locking arrangement also advantageously comprises locking parts which prevent the movement of the secured unit in the longitudinal direction and in the vertical direction.

Securing elements are also formed between the cargo units in such a way that there is one securing part on either longitudinal side of the cargo unit, which securing part is structured and arranged to correspond to the shape of the securing part located on an adjacent cargo unit or on the bulkhead of the vessel such as to provide a securing element forming a securing arrangement, said securing element being located on the longitudinal side of the cargo unit and, similarly, on the longitudinal bulkhead of the vessel or on the longitudinal side of an adjacent cargo unit. Locking parts or equivalent are advantageously formed in connection with the securing element for preventing said securing element from being opened in the longitudinal and the vertical direction. The part of the securing element which is mounted on the bulkhead of the vessel can be replaced, when needed, for example, in old vessels, with a sufficient number of chains and equivalent known from prior art.

This invention is suitable for use in connection with securing cargo units which are loaded horizontally onto a vessel, in particular rolltrailers, cassettes, semitrailers and similar types of cargo units. In this description, a cargo unit refers to a rolltrailer, a cassette and/or a semitrailer with their cargoes, and in connection with semitrailers, the cargo unit also includes a trestle intended for supporting and securing the semitrailer.

The securing element is formed of two securing parts which are located on two adjacent cargo units or on a cargo unit and a bulkhead of a vessel, which securing parts when connected to each other constitute an interlocking coupling such that the cargo remains in place when the vessel is sailing. In connection with the securing element, locking parts are provided on the adjacent cargo units or on the cargo unit and on the bulkhead of the vessel adjacent to it in order to prevent longitudinal and vertical movement of the cargo unit.

In accordance with an advantageous embodiment of the invention, the trestle used for supporting and securing a semitrailer comprises securing parts on both sides in order to form a securing element in accordance with the invention, whereby the trestle can be reliably secured to the vessel. Adjacent trestles have securing parts for securing them to each other and, in addition, the trestle comprises means for coupling it to a tugmaster and to a semitrailer.

BRIEF DESCRIPTION OF THE DRAWINGS

In the following, the invention will be described in more detail with reference to the figures in the accompanying drawing, to the details of which the invention is not by any means intended to be narrowly confined.

DETAILED DESCRIPTION OF THE INVENTION

Figure 1A:
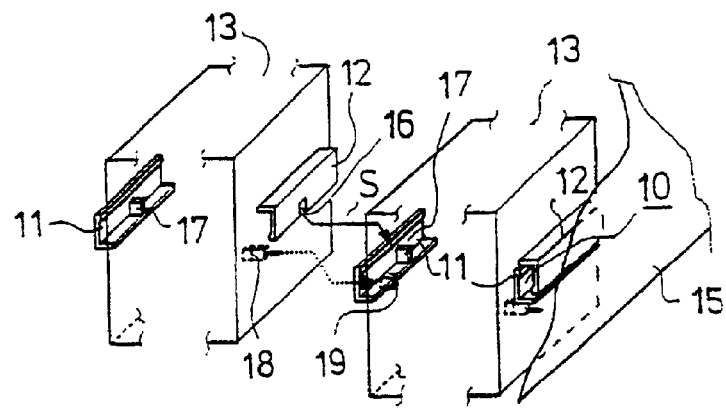
FIGS. 1A-1J show schematic embodiment examples of the securing element in accordance with the invention.

As schematically shown in FIG. 1A, a securing element 10 according to the invention comprises two securing parts 11,12, which have been shaped so as to mate with each other such that, when placed one upon the other in the manner shown by the arrow S, they form a securing element 10 of the tongue-and-groove type providing an interlocking coupling. When the securing element 10 is used on a vessel, a first securing part 11 is preferably fixed to a longitudinal bulkhead 15 of the vessel and a respective second securing part 12 is fixed to a cargo unit 13 which is to be secured and on the other side of which there is again similarly a first securing part 11, and in the next cargo unit 13 there is a respective second securing part 12. The respective securing parts 11,12 are coupled to each other, thereby forming a securing arrangement provided by means of the securing element 10. The securing parts 11,12 located on the cargo unit 13 are placed on either longitudinal side of the cargo unit 13. The securing element 10 additionally includes a locking arrangement formed on the securing parts 11,12 in order to prevent the longitudinal movement of the cargo units 13, which locking arrangement is accomplished in FIG. 1A by means of a locking groove 16 made into one securing part 12 and by means of a locking piece 17 provided on the respective other securing part 11. The securing parts 11, 12 of the securing element 10 are simultaneously positioned in place by means of this locking 16,17 which prevents longitudinal movement. Furthermore, a second locking arrangement is provided in connection with the securing element 10 in order to prevent the vertical movement of the cargo units 13, for example, a locking pin 18 in connection with one securing part 12 and a locking hole 19 in connection with the respective other securing part 11.

Figure 1B:
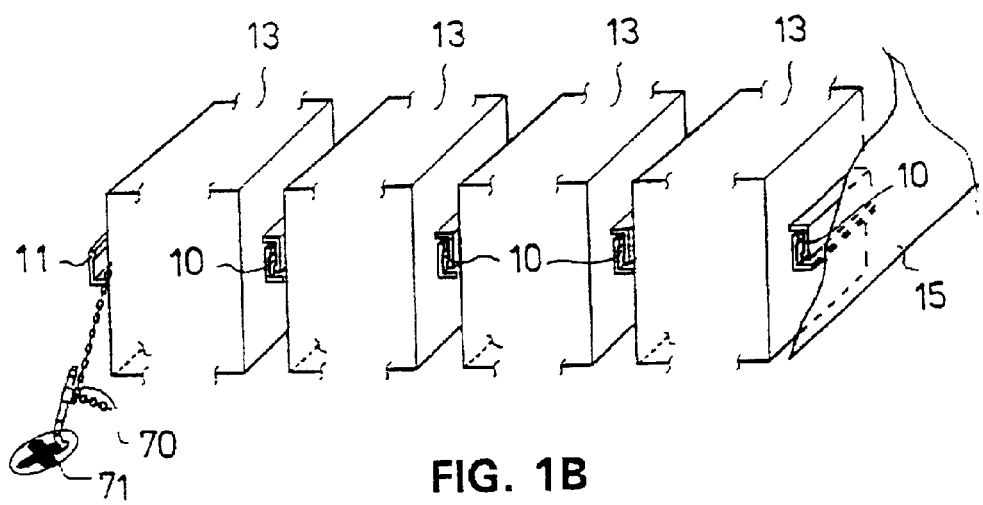

FIG. 1B schematically shows several securing elements 10 in accordance with the invention coupled to one another in order to secure several cargo units 13 to one another. At one side, the outermost securing element 10 is secured to the bulkhead 15 of the vessel and, at the other side, the securing part 11 of the securing element 10 remains free and the cargo unit 13 is lashed from this by means of a chain, a wire, a webbing or equivalent 70 to the deck of the vessel, for example, to a lashing pot 71 located therein.

Figure 1C:
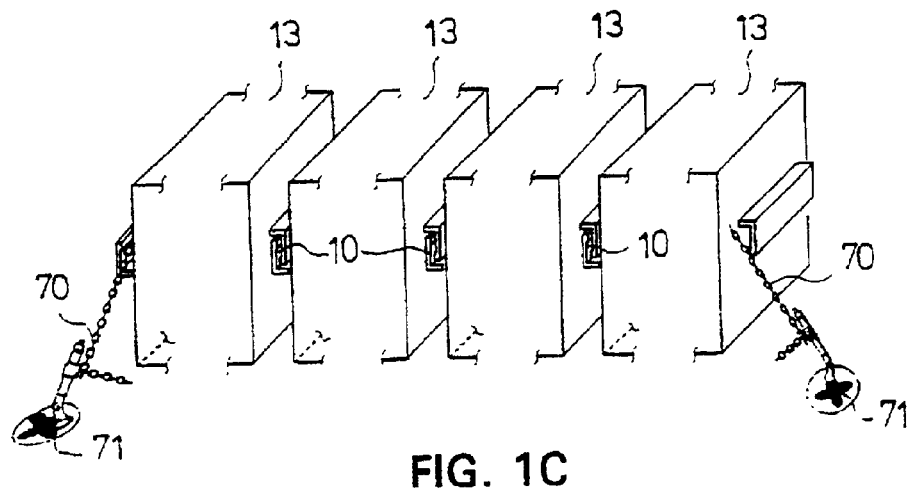

FIG. 1C shows an example in which cargo units 13 have been coupled to one another by means of securing elements 10 in accordance with the invention, and both sides of the cargo unit combination have been lashed by means of a webbing, a chain, a wire or equivalent 70 to a lashing pot 71 located in the deck of the vessel.

Figure 1D:
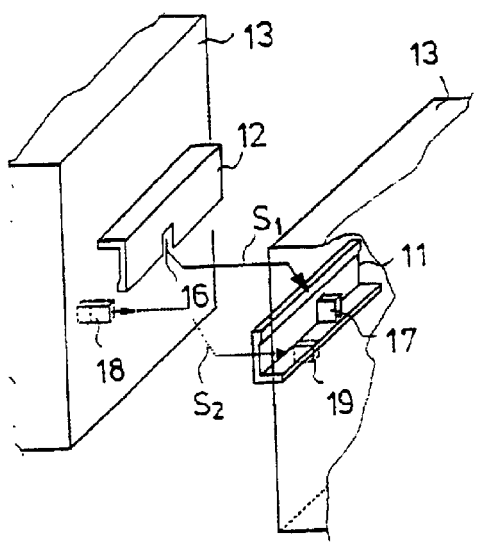

FIG. 1D shows the example of the invention shown in FIGS. 1A-1C as a schematic partial enlargement, and the same reference numerals have been used of the corresponding parts, in which the securing parts 11,12 of the securing element 10 provide an interlocking coupling of the tongue-and-groove type. The arrow S1 shows the coupling of the securing parts 11 and 12 to each other. The arrow S2 shows the locking of the securing arrangement in the vertical direction by means of a combination 18,19 of the locking pin and the locking hole. The longitudinal movement of the cargo units 13 is prevented by means of a combination 16,17 of the locking groove and the locking piece.

Figure 1E:
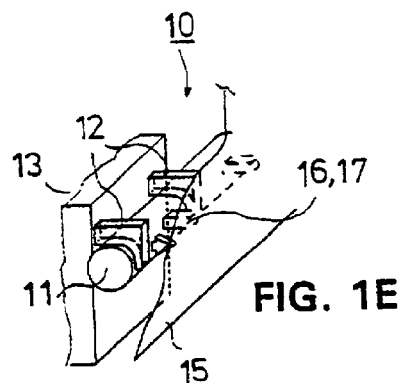
Figure 1F:
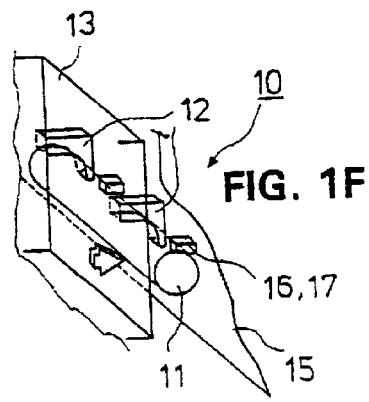

FIGS. 1E-1F show an embodiment example of the invention in which the securing element 10 is formed of a bar-shaped part 11 and of hook-shaped parts 12 fastened onto it, which provide an interlocking coupling. The longitudinal movement of the cargo units 13 is prevented by means of the locking groove/locking piece arrangement 16,17.

Figure 1G:
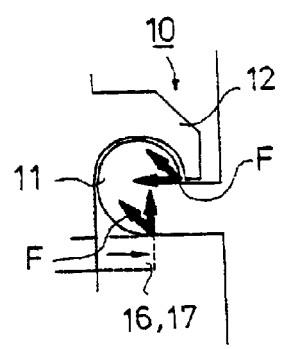
Figure 1H:
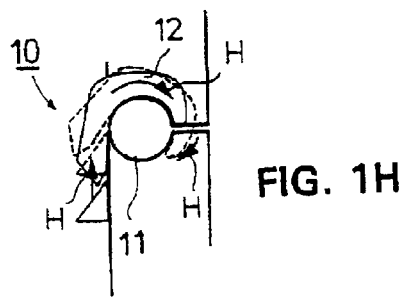

FIGS. 1G and 1H show some further embodiment examples of the invention, in which in FIG. 1G the securing element 10 comprises a hook part 12 which is fixed to the cargo unit 13 and a respective bar-shaped part 11 which is fixed to the bulkhead of the vessel and which has been formed into a tongue type of part. A locking groove/locking piece 16,17 is provided for locking the securing element. In FIG. 1G, the forces acting in the coupling are indicated by the arrows F. FIG. 1H shows a securing element 10 which comprises a bar-shaped securing part 11 and a hook part 12. As shown in FIG. 1H, the hook part 12 is turnable such that when it turns in the manner indicated by the arrows H, the securing element is locked. In accordance with the invention, an interlocking coupling is provided which forms a securing element 10 whose geometric shape is such that the securing does not open without significant deformation.

Figure 1I:
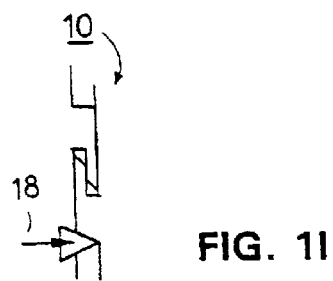
Figure 1J:
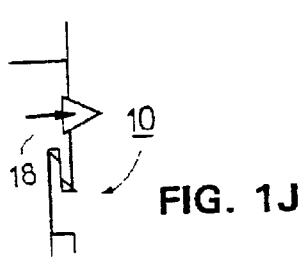

FIGS. 1I and 1J show some further applications of the securing element 10 in accordance with the invention, in which the securing element forms an interlocking coupling which does not open by itself without significant deformation. The location of the locking 18 of the securing element 10 can be as shown in FIGS. 1I and 1J.

The securing elements 10 in accordance with the invention illustrated in FIGS. 1A-1J are used in connection with cargo units 13, such as, rolltrailers, cassettes and trestles of semitrailers, which are loaded horizontally and on which it is easy to mount the securing part/securing parts 11,12 needed for the securing element 10 of the invention. As previously mentioned above, the first securing part 11 is advantageously fixed to the longitudinal bulkhead 15 of the vessel in the cargo space in order to secure the first cargo unit 13. When desired, depending on the loading direction, the first/last securing part 11;12 may also be located on the transverse bulkhead/bulkheads of the cargo space. The securing part 11;12 fixed to the bulkhead 15 of the cargo space preferably extends over the entire length of the cargo space, and it can be located on one or both of the longitudinal bulkheads 15 of the cargo space. The securing parts 11,12 of the securing element 10 are fastened to each other such that the next cargo unit 13 is raised and the securing parts 11,12 are fitted in place or the securing parts 11,12 are caused to slide in the longitudinal direction so as to interlock with each other. The securing is positioned in the longitudinal direction by means of the combination 16,17 of the locking groove and the locking piece and vertical movement is prevented by means of the combination 18,19 of the locking pin and the locking hole.

Figure 2:
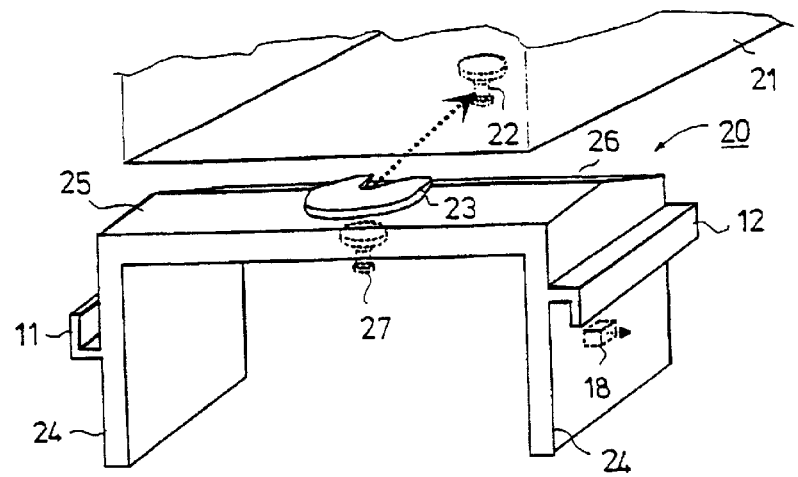
FIG. 2 is a schematic illustration of a device according to one application of the invention for use in connection with a semitrailer.

As shown in FIG. 2, a trestle 20 used in supporting and securing a semitrailer 21 comprises securing parts 11,12, which are located on the sides and which form a securing element 10 in accordance with the invention, and a pin 27 which is coupled to a tugmaster. In addition, the trestle 20 includes a coupling part 23, by means of which the trestle is connected to a kingpin 22 of the semitrailer 21. The trestle 20 comprises lateral walls, i.e. legs 24, the outer side of both of them being provided with a respective securing part 11,12 forming a securing element 10 in accordance with the invention as well as with locking combinations preventing longitudinal and vertical movement, of which a locking pin 18 is shown in the figure. The legs 24 are interlinked by means of a planar part 25, whose rear part with respect to the front part of the semitrailer has been bevelled to form a bevelled portion 26.

Figure 5:
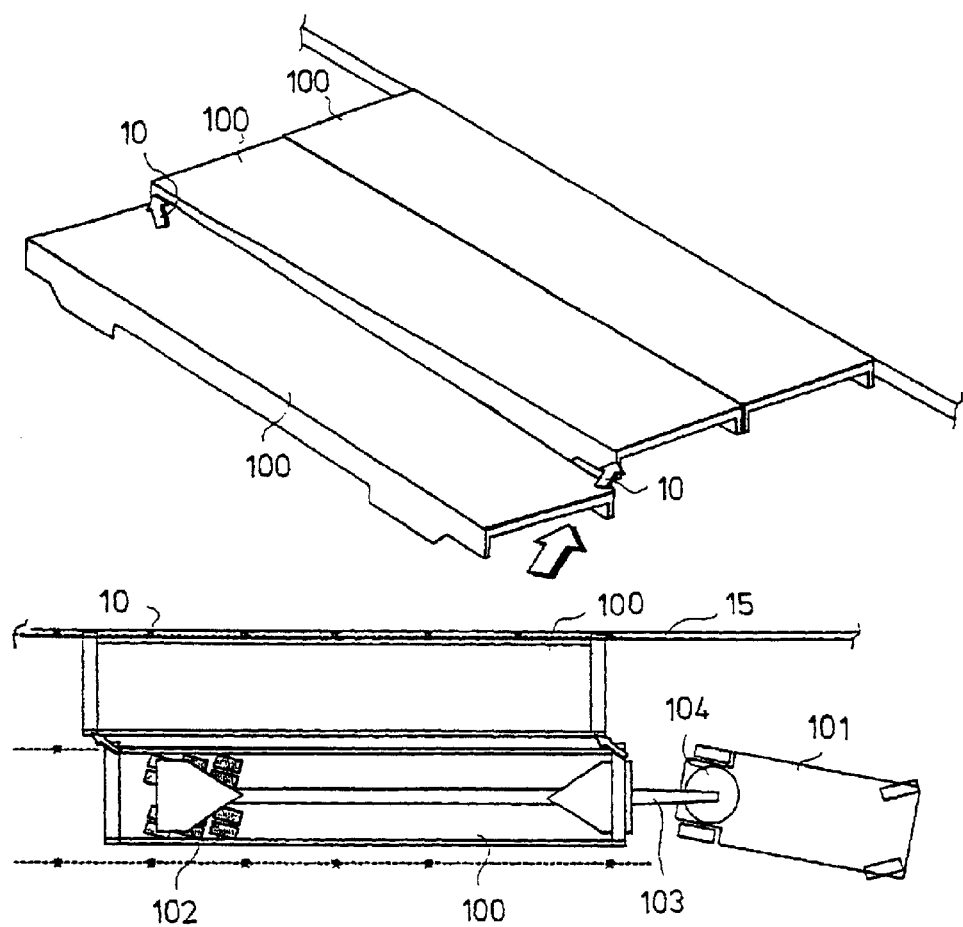
FIG. 5 schematically shows handling and securing of a cassette when the invention is applied.

In the following, the invention will be described with reference to some of its practical applications, in FIGS. 3A and 3B relating to a semitrailer, in FIG. 3 relating to a rolltrailer and in FIG. 5 relating to cassettes. In the figures, the circled numerals indicate stages of operation, and they shall not be mixed up with those reference numerals shown in the figures which have not been circled.

Figure 3A:
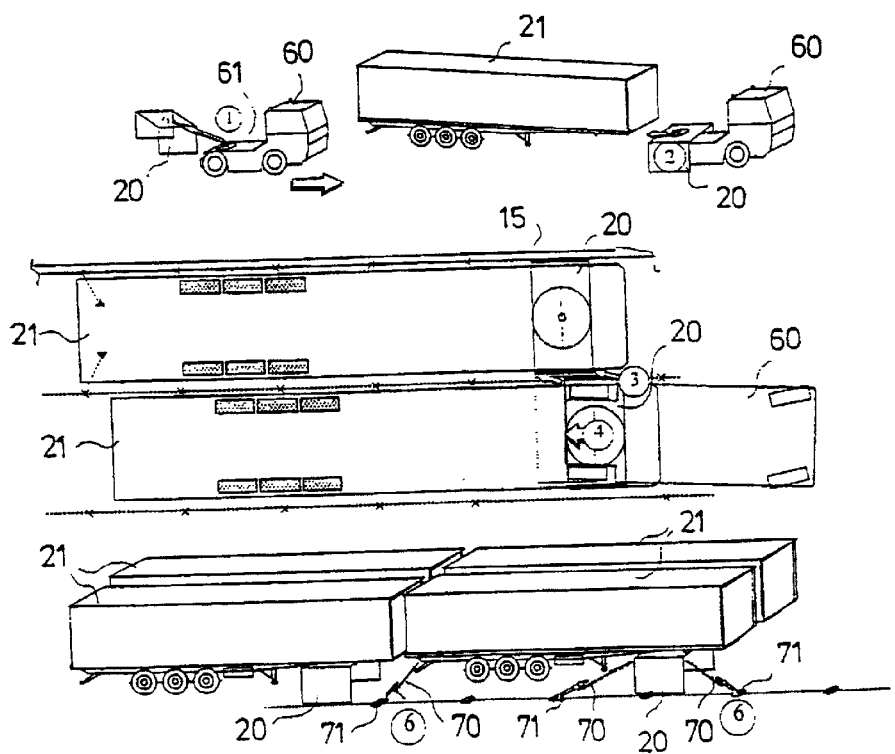
FIGS. 3A-3B schematically show handling and securing of a semitrailer when the invention is applied.
Figure 3B:
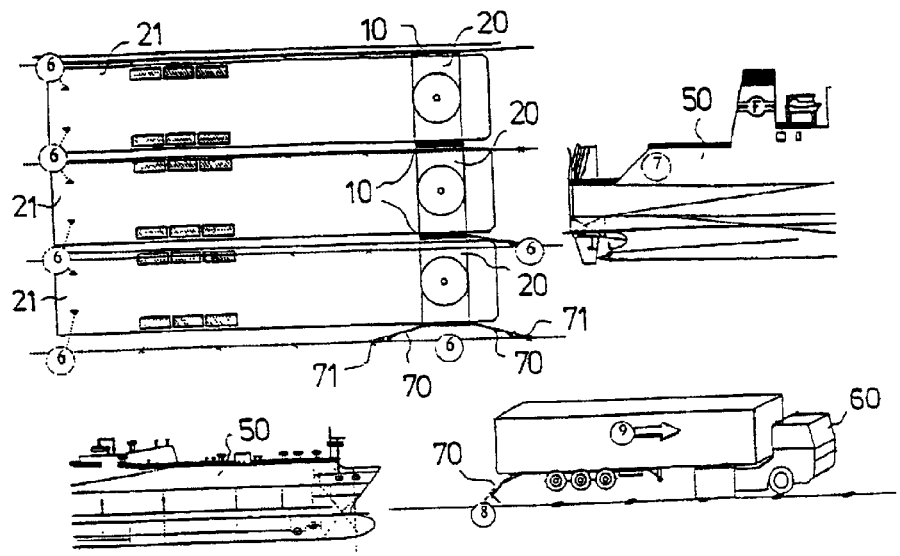

FIGS. 3A and 3B show an arrangement in handling a semitrailer 21 when it is moved for transport onto a vessel 50. As shown in FIG. 3A, at the stage 1, a tugmaster 60 grasps a trestle 20. A fifth wheel 61 of the tugmaster 60 is locked to a kingpin 27 located on the trestle 20 and the tugmaster 60 pushes the trestle 20 under the trailer 21, in which connection the trestle 20 is locked to the trailer 21, i.e. a lock 23 of the trestle 20 is locked to a kingpin 22 provided on the trailer 21 and the legs of the trailer 21 are wound up. After that, the tugmaster/semitrailer/trestle combination is driven onto a ship 50. In the stages 3-4, the combination is parked, if it is on the outermost lane, at a suitable distance from the preceding row; if it is not on the outermost lane (1st trailer in a row), in the same transverse line with an adjacent trestle 20, in contact with the adjacent trestle 20. In other words, the kingpins 27 of the adjacent units are in the same transverse line. The trestle 20 is driven so as to be in contact with the bulkhead 15 of the vessel 50 or with an adjacent trestle 20. At the stage 4, the trestle is driven to its longitudinal position. The adjacent securing parts are fastened and locked, a securing element 10 being thereby formed. After that, the tugmaster 60 is detached from the trestle 20 and it is driven away. The rear of the trailer 21 can be lashed, when needed, to a lashing pot 71 located in the deck by means of chains 70. If neither end of a row is locked by means of the securing element 10 to the longitudinal bulkhead 15 of the vessel (vessel 50 in which no alterations have been made to the present one or which has not been originally built for the system disclosed), both ends of the trestle row are lashed by using, for example, chains 70. When needed, the trestles located in between can be provided with additional lashings. At the stage 6, the semitrailers 21 have been secured to one another by means of securing elements 10 of the invention provided on the trestles 20 and the outermost semitrailer has been secured to the longitudinal bulkhead 15 of the vessel 50 for the time of transport on the vessel 50. The vessel 50 sails to a port of destination (stage 7). When the cargo is unloaded at the stage 8, the chains 70 and equivalent lashings are detached. When the invention is applied at the stage 9, the tugmaster 60 grasps the trestle 20 and the locking between the trestles 20 is opened, the cargo unit is raised by means of the tugmaster and the combination is driven to a yard.

Figure 4:
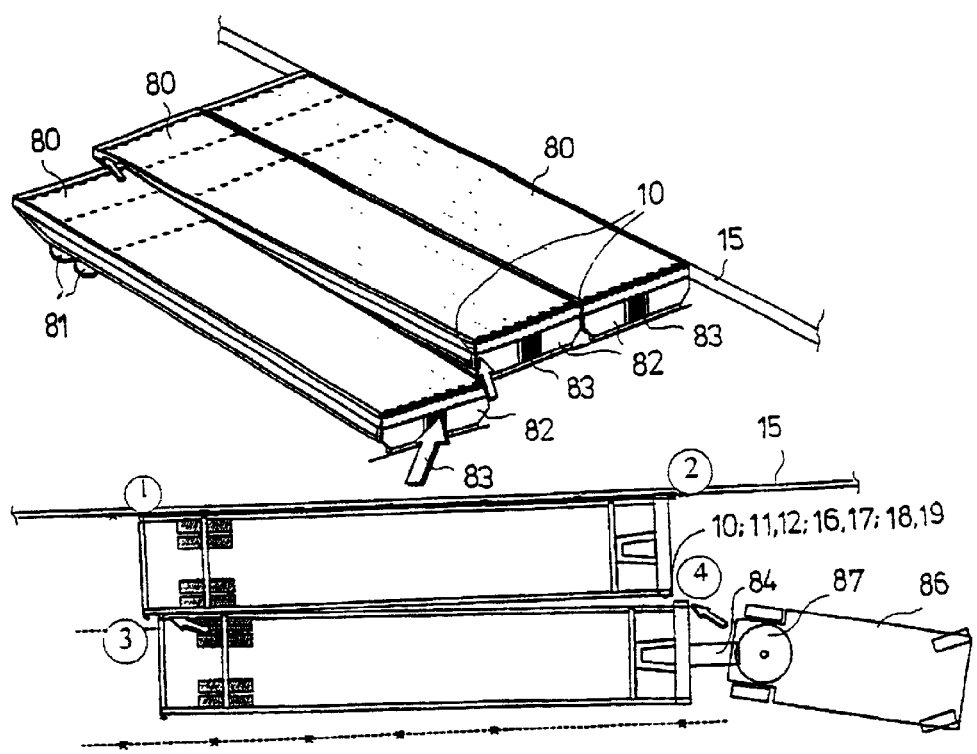
FIG. 4 schematically shows handling and securing of a rolltrailer when the invention is applied.

In the following, the invention will be described in connection with rolltrailers with reference to FIG. 4. The rolltrailers 80 have wheels 81 at their rear end and a fixed leg 82 at the front end, said fixed leg having a gooseneck opening 83. A gooseneck 84 is attached to a liftable fifth wheel 87 of a tugmaster 86, the gooseneck 84 being able to turn around said fifth wheel. The lower end of the gooseneck 84 is pushed into the gooseneck opening 83, which keeps the gooseneck 84 aligned with the rolltrailer 80. The front end of the rolltrailer 80 is lifted by lifting the fifth wheel 87. The rear end of the rolltrailer 80 moves parallel to the wheels 81, the front end is steered according to the driving line of the tugmaster 86. The towing end of the trailer 80 comprises on one side in accordance with the invention a securing element 10, securing parts 11,12 and, for example, locking combinations 16,17;18,19 by which longitudinal and vertical movement is prevented. At the rear of the trailer 80 or over the entire length of the side there is an even vertical guide surface, against which the next trailer 80 to be loaded can slide. At the towing end of the trailer 80 on the other side there is a securing part 11,12 of the securing element 10 in accordance with the invention, to which securing part the next trailer 80 is fastened by means of a respective securing part 12,11. This kind of part, for example, in the form of a continuous rail, may also be provided on the longitudinal bulkhead 15 of the vessel. When the front end of the rolltrailer 80 is in place, the securing parts 11, 12 are coupled and the locking 16,17;18,19 is engaged.

In the following, the invention will be described in connection with cassettes with reference to FIG. 5, according to the illustration of which a cassette 100 is moved by means of a special transfer car 101, the rear end of which is provided with turnable wheels 102 and the front end of which is provided with a fixed gooseneck 103. The gooseneck 103 is attached to a liftable fifth wheel 104, around which the gooseneck 103 can turn. The cassette 100 is lifted at both ends, the front end by raising the fifth wheel 104, the rear end by means of a lifting mechanism of the wheels 102. As shown in FIG. 5, when the invention is applied, on one side of the cassette 100 there are in accordance with the invention a securing element 10 comprising securing parts 11,12 as well as locking combinations 16,17;18,19 for preventing longitudinal and vertical movement. The side of the cassette 100 is an even vertical guide surface against which the next cassette to be loaded can slide. On the other side of the cassette 100 there is a securing part 11,12 to which the respective securing part 12, 11 of the next cassette 100 is coupled. This kind of part, for example, in the form of a continuous rail, may also be provided on the bulkhead 15 of the vessel. When the front end of the cassette 100 is in place, the cassette 100 is lowered onto the deck such that a hook grasps a rail and the locking is engaged. Since the rear of the cassette 100 can be lifted and since both ends comprise steerable wheels, the cassette 100 can be secured at both ends by means of the securing element 10.

When using the securing element 10 according to the invention, the sides of the cargo units 13;20,21;80;100 (or of the trestle) can be driven at a suitable angle into contact with one another. Since at least one end of the unit 13 is always on support of the fifth wheel of the liftable tugmaster 60;86;101, the upper securing part 12 of the securing element 10 can be guided above the lower one 11, when this is lowered, it is guided to its securing point, after which the lockings 16,17;18,19 are engaged. When the securing element 10 in accordance with the invention is used, the units locked side by side so as to form a package prevent one another from tipping over in a transverse direction. The great moment force produced by the longitudinal thrust motion of the vessel, occurring in a heavy swell of the sea, directed at the base of the row comprising several units 13, is neutralized by the friction of each unit 13 as well as by sufficient additional support at the free end of the row and, when needed, between the ends as well.

Above, the invention has been described only with reference to some of its advantageous embodiment examples, to the devils of which the invention is, however, not at all intended to be narrowly confined. Many modifications and variations are feasible within the inventive idea defined in the following claims.

What is claimed is:

1. A method for securing horizontally loaded cargo units on a vessel, comprising the steps of:

providing a plurality of cargo units defining a longitudinal driving direction;

arranging a first securing mechanism on a first longitudinally-extending vertical side of each of the cargo units;

arranging a first locking mechanism on the first side of each of the cargo units;

arranging a second securing mechanism on a second longitudinal-extending vertical side of each of the cargo units, the second securing mechanism being arranged to engage with the first securing mechanism on another one of the cargo units, the first and second longitudinal sides being on opposite sides of the cargo unit;

arranging a second locking mechanism on the second side of each of the cargo units, the second locking mechanism being arranged to engage with the first locking mechanism on another one of the cargo units to prevent vertical movement of engaged cargo units relative to one another; and securing each of the cargo units to an adjacent one of the cargo units in a transverse direction perpendicular to the longitudinal direction by positioning each of the cargo units alongside the adjacent one of the cargo units such that the first side of the cargo unit faces the second side of the adjacent one of the cargo units, engaging the first securing mechanism on the cargo unit with the second securing mechanism on the adjacent one of the cargo units, engaging the first locking mechanism on the cargo unit with the second locking mechanism on the adjacent one of the cargo units to thereby form an interlocking coupling between the cargo unit and the adjacent one of the cargo units; and constructing the first and second securing mechanisms to enable the cargo units to slide along each other in the longitudinal direction until the first locking mechanism engages the second locking mechanism.

2. The method of claim 1, further comprising the steps of:

arranging a first securing mechanism on a vertical wall of the vessel;

arranging a first locking mechanism on the vertical wall of the vessel; and securing one of the cargo units to the vertical wall of the vessel by positioning the cargo unit alongside the vertical wall of the vessel such that the second longitudinal side of the cargo unit faces the vertical wall of the vessel, and engaging the second securing mechanism on the cargo unit with the first securing mechanism on the vertical wall of the vessel.

3. The method of claim 2, further comprising the step of forming a mated assembly of a plurality of the cargo units and the vessel which is substantially continuous in strength.

4. The method of claim 2, wherein the step of securing one of the cargo units to the vertical wall of the vessel further comprises the steps of:

lifting the second securing mechanism on the cargo unit onto the first securing mechanism on the vertical wall of the vessel; and engaging the second locking mechanism on the cargo unit with the first locking mechanism on the vertical wall of the vessel to thereby form an interlocking coupling between the cargo unit and the vessel.

5. The method of claim 2, further comprising the steps of:

arranging a third locking mechanism on the second longitudinal side of each of the cargo units; and arranging a fourth locking mechanism on the vertical wall of the vessel, the fourth locking mechanism being arranged to engage with the third locking mechanism on one of the cargo units to prevent relative longitudinal movement between the cargo unit and the vessel.

6. The method of claim 5, wherein the step of securing one of the cargo units to the vertical wall of the vessel further comprises the step of engaging the third locking mechanism on the cargo unit with the fourth locking mechanism on the vertical wall of the vessel to thereby form an interlocking coupling between the cargo unit and the vessel in which both relative vertical movement and longitudinal movement between the cargo unit and the vessel is prevented.

7. The method of claim 1, further comprising the step of arranging a cooperating locking mechanism on the first and second vertical sides of each of the cargo units to prevent longitudinal movement of engaged cargo units.

8. The method of claim 7, wherein the cooperating locking mechanism comprises first and second locking members, further comprising the steps of:

arranging the first locking member on the first securing mechanism, and arranging the second locking member on the second securing mechanism.

9. The method of claim 1, wherein the step of securing each of the cargo units to an adjacent one of the cargo units comprises the step of lifting the first securing mechanism on the cargo unit onto the second securing mechanism of the adjacent one of the cargo units.

10. The method of claim 1, further comprising the steps of:

arranging a third locking mechanism on the first longitudinal side of each of the cargo units; and arranging a fourth locking mechanism on the second longitudinal side of each of the cargo units, the fourth locking mechanism being arranged to engage with the third locking mechanism on one of the cargo units to prevent relative longitudinal movement between the engaged cargo units.

11. The method of claim 10, wherein the step of securing each of the cargo units to an adjacent one of the cargo units further comprises the step of engaging the third locking mechanism on the cargo unit with the fourth locking mechanism on the adjacent one of the cargo units to thereby form an interlocking coupling between the engaged cargo units in which both relative vertical movement and longitudinal movement between the engaged cargo units is prevented.

12. A method for securing horizontally loaded semitrailers which are attached to a trestle on a vessel, comprising the steps of: providing a plurality of semitrailers defining a longitudinal, driving direction;

arranging a first securing mechanism on a first longitudinally-extending vertical side of each of the trestles;

arranging a first locking mechanism on the first side of each of the trestles;

arranging a second securing mechanism on a second longitudinal-extending vertical side of each of the trestles, the second securing mechanism being arranged to engage with the first securing mechanism on another one of the trestles, the first and second longitudinal sides being on opposite sides of the trestles;

arranging a second locking mechanism on the second side of each of the trestles, the second locking mechanism being arranged to engage with the first locking mechanism on another one of the trestles to prevent vertical movement of engaged trestles and therefore the semitrailers relative to one another; and securing each of the trestles to an adjacent one of the trestles in a transverse direction perpendicular to the longitudinal direction by positioning each of the trestles alongside the adjacent one of the trestles such that the first side of the trestles faces the second side of the adjacent one of the trestles, engaging the first securing mechanism on the trestles with the second securing mechanism on the adjacent one of the trestles, and engaging the first locking mechanism on the trestles with the second locking mechanism on the adjacent one of the trestles to thereby form an interlocking coupling between the trestles and the adjacent one of the trestles.

13. The method of claim 12, further comprising the steps of:

removably coupling a trestle to the semitrailers by attaching a kingpin of the semitrailer to the trestle;

arranging a first securing mechanism on a first vertical wall of the trestle;

arranging a second securing mechanism on a second vertical wall of the trestle;

positioning each of the semitrailers alongside an adjacent one of the semitrailers such that the second vertical wall of the trestle of each semitrailer faces the first vertical wall of the trestle of the adjacent one of the semitrailers; and securing each of the semitrailers to the adjacent one of the semitrailers by engaging the first securing mechanism on the trestle of the semitrailer with the second securing mechanism on the trestle of the adjacent one of the semitrailers to thereby secure the trestles to one another.

14. In a horizontally loaded semitrailer attached to a trestle, the trestle extending in a longitudinal direction and having at least two longitudinally-extending vertical sides opposite and parallel to one another, a device for securing the trestle and therefore the semitrailer to another trestle and therefore another semitrailer or to a vessel comprising:

a first securing mechanism arranged on a first one of the longitudinally-extending vertical sides;

a first locking mechanism arranged on said first side;

a second securing mechanism arranged on a second one of said longitudinal-extending vertical sides, said second securing mechanism having a form engageable with said first securing mechanism; and a second locking mechanism arranged on said second side, said second locking mechanism having a form engageable with said first locking mechanism and such that relative vertical movement between engaged ones of said first and second locking mechanisms is prevented, said first and second securing mechanisms and said first and second locking mechanisms being structured and arranged to enable the cargo unit to be secured to an adjacent cargo unit in a transverse direction perpendicular to the longitudinal direction by positioning the trestle alongside the adjacent trestle such that said first side of the trestle faces the second side of the adjacent trestle, engaging said first securing mechanism on the trestle with the second securing mechanism on the adjacent trestle, and engaging said first locking mechanism on the trestle with the second locking mechanism on the adjacent trestle to thereby prevent relative vertical movement between the trestles and therefore the cargo units.

15. The device of claim 14, further comprising a third locking mechanism arranged on said first side; and a fourth locking mechanism arranged on said second side, said fourth locking mechanism having a form engageable with said third locking mechanism and such that relative longitudinal movement between engaged third and fourth locking mechanisms is prevented, said third and fourth locking mechanisms being structured and arranged such that when the semitrailer is secured to the adjacent semitrailers, said third locking mechanism on the trestle engages with the fourth locking mechanism on the adjacent trestle to thereby prevent relative longitudinal movement between the semitrailers.

16. The device of claim 15, wherein said third locking mechanism is formed on said first securing mechanism and said fourth locking mechanism is formed on said second securing mechanism.

17. The device of claim 14, wherein said semitrailer includes a kingpin, further comprising said trestle for supporting said semitrailer and including attachment means for attaching said trestle to said kingpin.

18. The device of claim 14, wherein said first locking mechanism is arranged in connection with said first securing mechanism and said second locking mechanism is arranged in connection with said second securing mechanism.

* * * * *